UNITED STATES PATENT OFFICE.

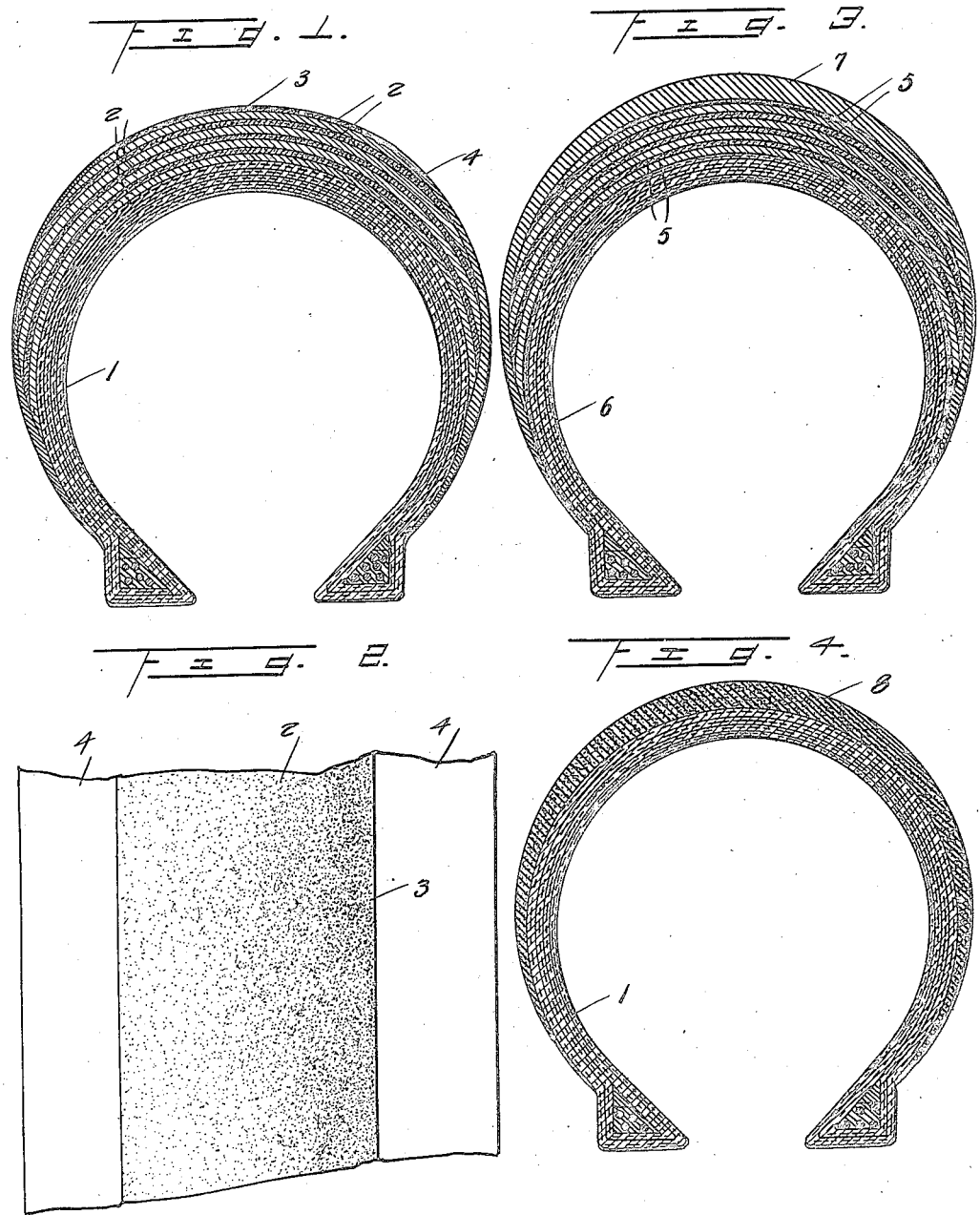

JOSEPH HOBSON AND ELMER E. GILBERT, OF COLTON, CALIFORNIA.

TIRE.

1,412,744.     Specification of Letters Patent.     Patented Apr. 11, 1922.

Application filed March 30, 1920. Serial No. 369,868.

*To all whom it may concern:*

Be it known that we, JOSEPH HOBSON and ELMER E. GILBERT, citizens of the United States of America, residing at Colton, in the county of San Bernardino and State of California, have invented certain new and useful Improvements in Tires; and we do hereby declare the following to be a full, clear, and exact description of the invention, such as will enable others skilled in the art to which it appertains to make and use the same.

This invention relates to new and useful improvements in tires and has for its primary object the employment of carborundum in the construction of tires which renders them substantially puncture proof, prevents skidding and slipping on wet pavements or roadways, and owing to the wearing quality of said material the lives of the tires are greatly increased and without any loss of resiliency.

With these and other objects in view as will become more apparent as the description proceeds, the invention consists in certain novel features of construction, combination and arrangement of parts as will be hereinafter more fully described and claimed.

For a complete understanding of our invention reference is to be had to the following description and accompanying drawing, in which:

Figure 1 is a sectional view, illustrating a tire constructed in accordance with our invention and showing the carborundum employed as a tread;

Figure 2 is a fragmentary plan view illustrating the same;

Figure 3 is a transverse sectional view illustrating a modified form of the invention in which the tire is treaded with rubber;

Figure 4 is a similar view illustrating another modified form of our invention in which the carborundum is mixed with the rubber during the refining process thereof.

Referring in detail to the drawing, the numeral 1 indicates the carcass of a pneumatic tire or shoe which is built up of layers of rubberized fabric in the desired manner. A plurality of plies of carborundum cloth 2, or fabric with carborundum cemented thereto, are placed one on the other and thoroughly cemented together to form a strong and durable tread 3 which is placed on or cemented to the carcass 1. The plies 2 vary in width so as to provide the thickest part of the tread at the crest of the tire. The edges of the plies 2 are covered by rubber 4 which is cemented or otherwise secured thereto for preventing dirt and other foreign matter from working between the plies and thus eventually causing loosening of the tread. It is to be noted that the carborundum cloth or fabric forms the wearing surface or face of the tire, and owing to its wearing quality the life of the tire is immensely lengthened over other tires, and also the plurality of plies of the carborundum cloth or fabric provides a tread that the passing of nails and the like therethrough is obviated thereby decreasing punctures to the pneumatic tube. The carborundum has a tendency to cut or wear anything coming in contact therewith thus it will prevent skidding or slipping as it will cut or grind the surface of the roadway. The carcass 2 may be of a new tire or the plies of carborundum cloth or fabric may be applied to an old carcass of which the tread has been removed.

Referring to our modified form of invention, as shown in Figure 3, the plies of carborundum cloth or fabric 5 are secured to the carcass 6 and a tread 7 of rubber is placed thereover and subjected to a vulcanizing process so that the plies of carborundum cloth or fabric are disposed between the tread and the carcass to form an internal armor and after the tread is worn off the carborundum cloth then assumes the wear thus providing a tire of a long wearing quality.

Referring to Figure 4, we have shown the tread 8 constructed from rubber in which is embedded carborundum so as to increase the wearing qualities of the rubber as well as increasing the traction of the rubber on wet pavements or roadways. The carborundum is mixed with the rubber during the refining process of said rubber so that the rubber becomes thoroughly impregnated with the carborundum.

While we have shown and described the preferred embodiment of our invention it will be understood that minor changes in construction, combination and arrangement of parts may be made without departing from the spirit and scope of the invention as claimed.

Having thus described our invention what we claim is:

A tire embodying a carcass, a plurality of layers of cloth containing a punctureresisting grit, said layers being secured together and to the outer surface of the carcass with sides bearing the grit disposed outwardly, said layers gradually decreasing in width from the carcass outwardly, and rubber strip means secured over the side edges of said layers and to the sides of said carcass inwardly of the layers, said rubber strip means sealing the side edges of said layers and assisting in securing said layers to the carcass.

In testimony whereof we affix our signatures in presence of two witnesses.

JOSEPH HOBSON.
ELMER E. GILBERT.

Witnesses:
F. L. RICHARDSON,
W. H. WRIGHT.